June 18, 1929.  J. P. JOHNSON  1,717,784
DIFFERENTIAL MECHANISM
Filed Nov. 16, 1925   3 Sheets-Sheet 1

June 18, 1929.  J. P. JOHNSON  1,717,784
DIFFERENTIAL MECHANISM
Filed Nov. 16, 1925  3 Sheets-Sheet 2

Inventor
James P. Johnson
Kwis Hudson & Kent
Attys

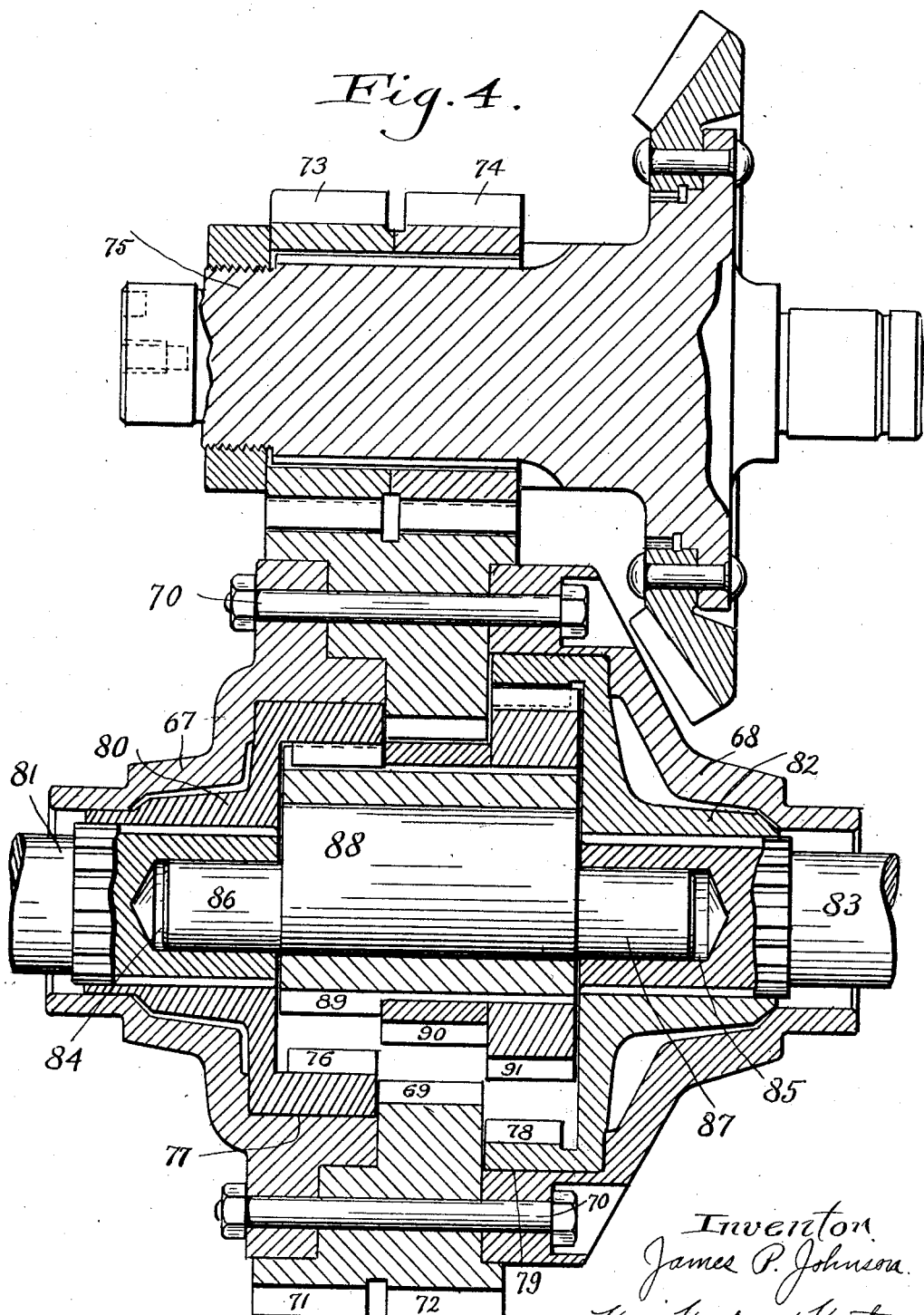

Patented June 18, 1929.

1,717,784

UNITED STATES PATENT OFFICE.

JAMES P. JOHNSON, OF CLEVELAND HEIGHTS, OHIO.

DIFFERENTIAL MECHANISM.

Application filed November 16, 1925. Serial No. 69,261.

This invention relates to differential gearing especially applicable for motor vehicle axles.

It is one of the objects of the invention to provide a differential mechanism that will be capable of transmitting power to both wheels of the axle under all conditions and irrespective of whether the wheels are rotating at the same speed or the amount of traction between either of the wheels and the surface with which they engage.

In the differential mechanisms that are commonly used, difficulty is frequently encountered because of the difference in traction of the two wheels so that when one of the wheels is on a relatively slippery surface and the other is on a surface giving good traction, the first wheel spins around and no driving power is transmitted to the second wheel so that there is practically no force tending to drive the vehicle.

It is, therefore, one of the objects of the present invention to provide a differential mechanism that will overcome this difficulty and permit either wheel to act as the main driving wheel when the other wheel has very little traction.

It is a further object of the invention to provide a differential mechanism, having the characteristics mentioned, which is highly efficient in operation and so constructed as to have the requisite strength, in its parts, to withstand the service to which it is subjected and, at the same time, be relatively compact and adapted for installation in place of the differentials now commonly used in axles of more or less standard construction.

A further object of the invention is to provide a differential mechanism the parts of which are adapted for commercial production with modern manufacturing equipment so that the cost of production will be within practicable limits.

Other objects of the invention and the features of novelty will be apparent from the following description taken in connection with the accompanying drawings, of which:

Fig. 4 is an axial section through a differential mechanism embodying my invention and especially adapted for the so-called double-reduction type of axle gearing.

Figure 1:
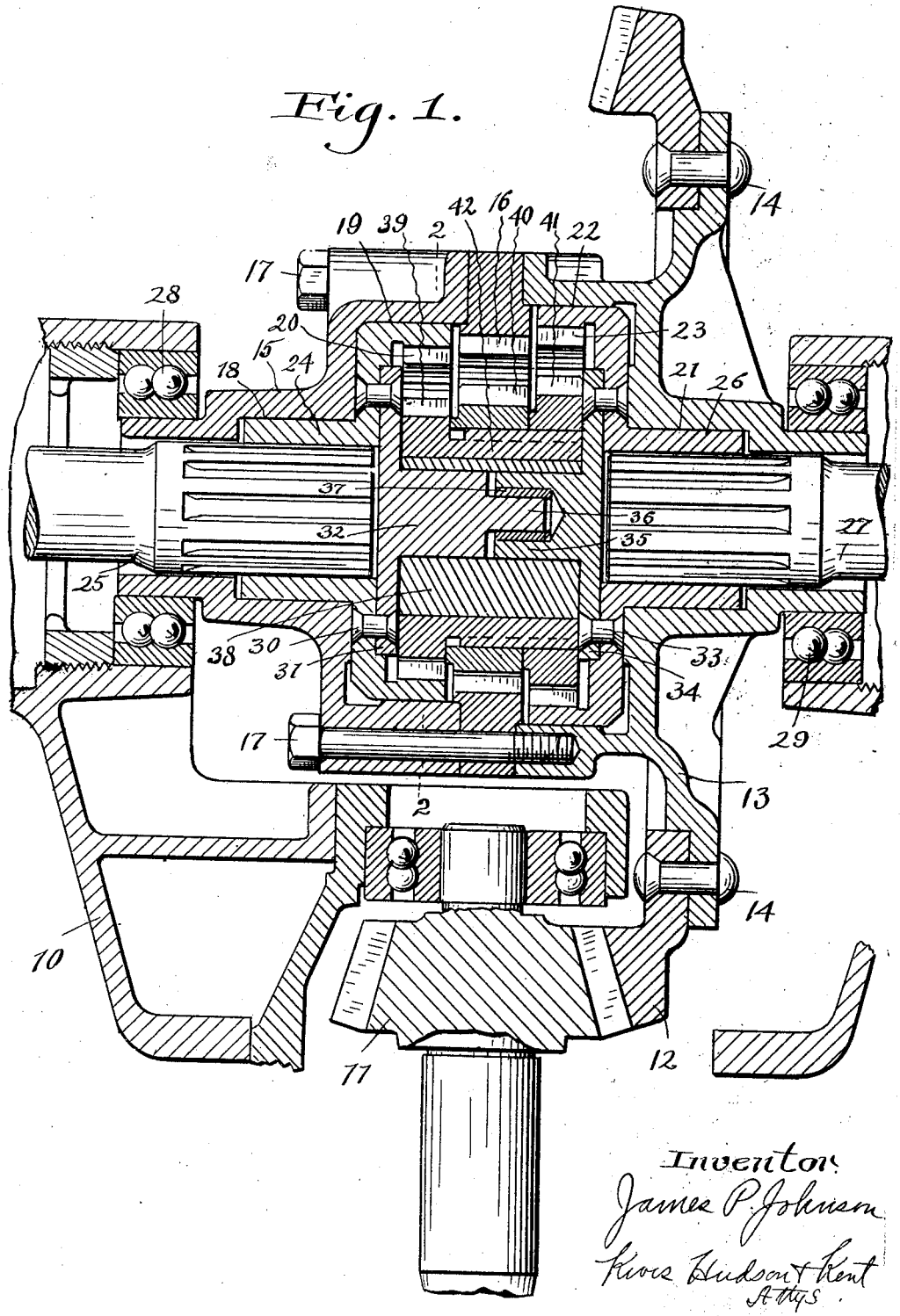
Fig. 1 is an axial section through a differential mechanism embodying my invention.
Figure 2:
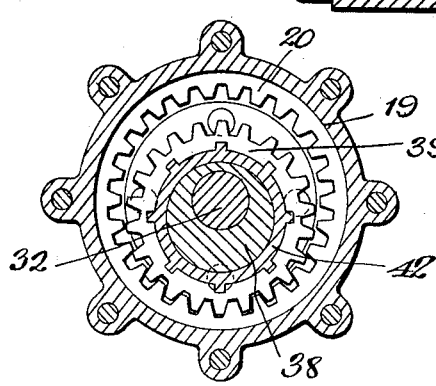
Fig. 2 is a transverse section on the line 2—2 of Fig. 1.

Referring to the form of the invention that is illustrated in Figs. 1 and 2, a portion of the usual differential-carrier is indicated at 10 and the usual bevel driving pinion is shown at 11. The pinion 11 meshes with a ring gear 12 which is secured to one of the end sections 13 of the differential housing by a circle of rivets 14. The other end section of the differential housing is indicated at 15 and between the sections 13 and 15 there is an internal gear 16, these three parts constituting the differental housing and being secured together by a circle of bolts 17. Rotatably supported on the bearing surfaces 18 and 19, on the interior of the section 15, is an internal gear 20 and rotatably supported on the bearing surfaces 21 and 22, in the end section 13, is the internal gear 23. The internal gears 16, 20 and 23 have a common axis but each of these gears is rotatable independently of the others. The interior of the hub 24, of the gear 20, is splined to receive the splined inner end of the shaft 25 which extends to and drives one of the road wheels. Similarly, the interior of the hub 26, of the gear 23, is splined to receive the splined inner end of the shaft 27 which extends to and drives the other road wheel. The differential housing is rotatably supported in the carrier 10 by means of the bearings 28 and 29, according to the usual practice. The splined connection between the gear 20 and the shaft 25 causes these parts to rotate together so that the shaft 25 is driven by the gear 20. In a similar manner, the splined connection between the gear 23 and the shaft 27 causes these parts to rotate together so that the gear 23 drives the shaft 27. Secured to the gear 20, by rivets 30, is a plate 31, having a journal 32 thereon. There is also secured to the gear 23, by rivets 33, a plate 34, having a journal 35, the journals 32 and 35 being co-axial with the shafts 25 and 27 and also co-axial with the gears 16, 20 and 23. Projecting from the journal 32 is a pilot 36 which engages a bearing 37 in the journal 35 so that the journals 32 and 35 are thus held accurately in alignment.

An eccentric sleeve 38 is rotatably mounted on the journals 32 and 35 and a cluster gear, comprising the three gears 39, 40 and 41, is rotatably mounted on the sleeve 38. The gear 39 has an externally splined hub 42 on which the gears 40 and 41, which are in the form of internally splined rings, are secured so that the gears 39, 40 and 41 rotate as a unitary structure, the same as if all of these gears were integrally formed.

The gear 39 meshes with the gear 20, and the gear 40, which is slightly larger than the gear 39, meshes with the gear 16, the latter being slightly larger than the gear 20. The gear 41, which is slightly larger than the gear 40, meshes with the gear 23 which, in turn, is slightly larger than the gear 16 so that the respective pairs of gears have progressively different ratios.

When the differential housing is rotated, by means of the gears 11 and 12, the internal gear 16 rotates the cluster gear, due to its engagement with the gear 40. The engagement of the gears 20 and 39 and the engagement of the gears 23 and 41, causes the shafts 25 and 27 to normally rotate at the same speed as the differential housing. Under these conditions there is no relative rotation of the gears within the differential housing but, when the shafts 25 and 27 rotate at different speeds, as when the vehicle is rounding a corner, one or both of the gears 20 and 23 will rotate differentially with respect to the gear 16, the eccentric sleeve 38 rotating on the journals 32 and 35 and the cluster gear rotating on the eccentric sleeve, to compensate for the differential movement of the gears.

If the gears 16, 20 and 23 were all of the same pitch diameter, which would make it necessary to also have the gears 39, 40 and 41 of the same pitch diameter, the cluster gear would then act as a positive lock to prevent any differential movement of the gears 20 and 23 with respect to the gear 16 but by varying the gear ratios, as above described, the gears 20 and 23 may rotate differentially with respect to the gear 16 and with respect to each other, the relative rotation of the eccentric sleeve 38 compensating for such differential movement. By having the speed ratios of the different pairs of gears differ only by relatively small amounts, as shown in the drawings, I obtain a condition which, to a certain extent, prevents either of the shafts 25 or 27 from rotating the other through the differential gearing. This condition has the advantage of producing what I term a semi-locking effect which permits power to be transmitted to both of the shafts 25 and 27 without regard to the amount of traction which the wheels, at the ends of these shafts, have. Motor vehicles frequently encounter road conditions wherein one of the driving wheels is on a surface giving good traction and the other is on a surface giving relatively small traction or, in extreme conditions, practically no traction, and my differential mechanism would prevent the wheel that is on the surface, giving little or no traction, from spinning around and thus preventing power from being transmitted to the other wheel. The more nearly the gears 16, 20 and 23 approach a common pitch diameter, the greater is this locking effect and, conversely, the greater the difference in the pitch diameters of these gears, the less is this locking effect.

Figure 3:
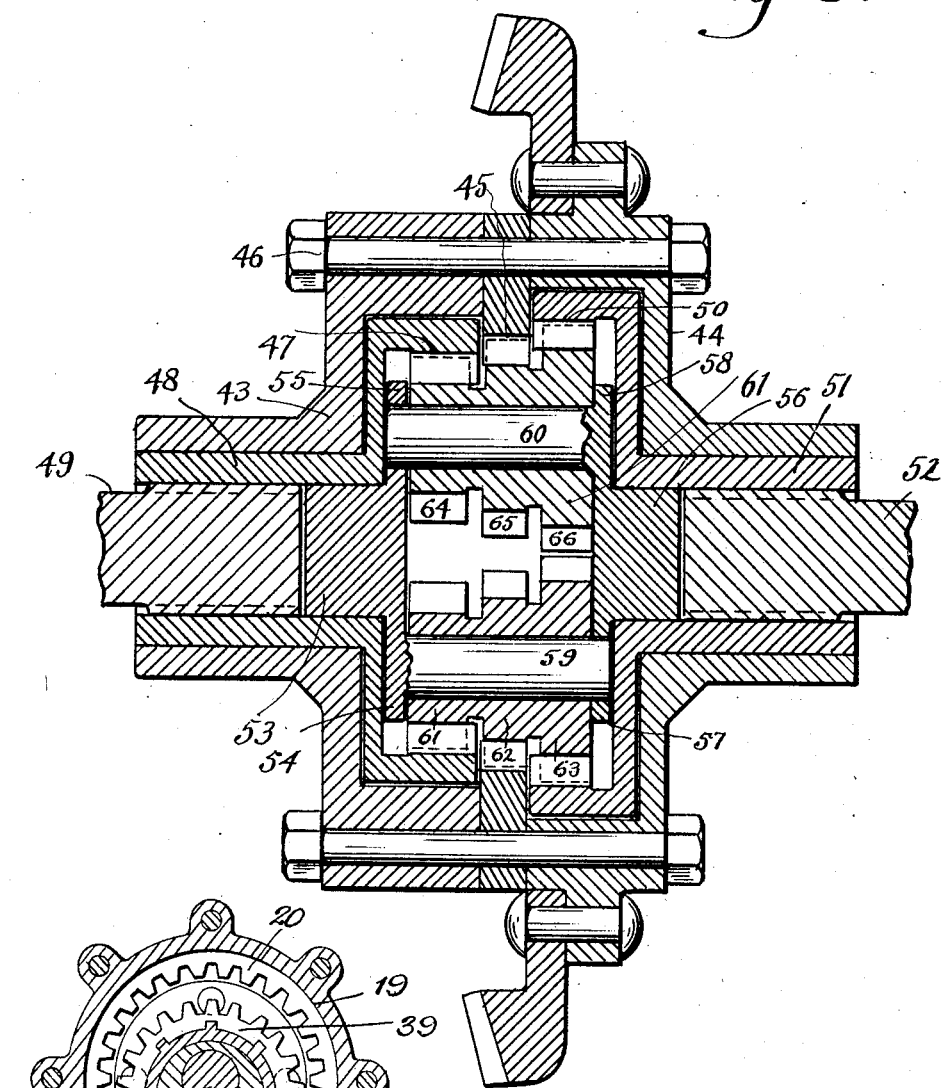
Fig. 3 is an axial section through another form of differential mechanism embodying my invention.

In the form of the invention illustrated in Fig. 3, the differential housing comprises the end sections 43 and 44 and the ring gear 45, which is clamped therebetween by means of the bolts 46. The internal gear 47 has its hub 48 rotatably mounted in the hub of the end section 43, of the differential housing, and is internally splined to receive the splined end of the axle shaft 49. In a similar manner, the internal gear 50 has a hub 51 that is rotatably mounted in the hub of the end section 44, of the differential housing, and is internally splined to receive the splined end of the shaft 52. Rotatably mounted in the inner end of the hub 48 is a stub shaft 53 having the oppositely arranged cranks 54 and 55. Rotatably arranged within the hub 51, is a stub shaft 56 having the oppositely arranged cranks 57 and 58. The crank 54 has a crank pin 59 thereon which has its outer end supported in the crank 57. Likewise, the crank 58 has a crank pin 60 which has its outer end supported in the crank 55. A cluster gear, comprising the gears 61, 62 and 63, is rotatably arranged on the crank pin 59 with the gear 61 in mesh with the internal gear 47, the gear 62 in mesh with the gear 45 and the gear 63 in mesh with the gear 50. There is another cluster gear comprising the gears 64, 65 and 66, which is rotatably arranged on the crank pin 60 with the gear 64 in mesh with the gear 47, the gear 65 in mesh with the gear 45 and the gear 66 in mesh with the gear 50.

This form of construction differs from that previously described in that there are two cluster gears, eccentrically mounted with respect to the axes of the shafts 49 and 52 but symmetrically arranged so that one of the cluster gears, with its crank pin, counterbalances the other. The internal gears are concentric to the axis of shafts 49 and 52 and the mechanism functions in a manner similar to that previously described, the crank pins 59 and 60 rotating about the axis of the shafts 49 and 52 to compensate for the differentiating movements of the gears. It will be noted that the various pairs of gears are in relatively stepped arrangement so as to provide the semi-locking effect previously referred to.

In the form of the invention illustrated in Fig. 4, the differential housing comprises the end sections 67 and 68 between which there is the internal ring gear 69, these parts being secured together by bolts 70. The internal gear 69 has two external gears 71 and 72 formed on its periphery, these gears being preferably of spiral form but having their teeth oppositely inclined so as to be balanced as regards end thrust. The gears 71 and 72 mesh, respectively, with gears 73 and 74 on the jack-shaft 75, this jack-shaft acting as the driving shaft for the differential gearing. The internal gear 76 is rotatably mounted on the bearing surface 77 in the end section 67, of the differential housing, and the internal gear 78 is rotatably mounted on the bearing surface 79 in the end section 68, of the differential housing. These internal gears are arranged on opposite sides of the ring 69, and the hub 80, of the gear 76, is internally splined to receive the splined end of the axle shaft 81. In a similar manner, the hub 82 of the internal gear 78 is internally splined to receive the splined end of the axle shaft 83. The inner ends of the shafts 81 and 83 are provided with the bores 84 and 85, respectively, these bores being concentric to the axis of the shafts and have rotatably arranged therein the trunnions 86 and 87 of a shaft 88, the axis of which is eccentric to the axis of the shafts 81 and 83. A cluster gear is rotatably arranged on the shaft 88 and comprises the gears 89, 90 and 91, the gear 89 meshing with the gear 76, the gear 90 meshing with the gear 69 and the gear 91 meshing with the gear 78. In manufacturing the cluster gear, I prefer to form the gear 89 with a relatively long hub having external splines, which are, in effect, short sections of the teeth of the gear 89. The gears 90 and 91 are in the form of internally splined rings which are pressed onto the hub of the gear 89, to provide the relatively stepped arrangement shown in the drawing.

The differential mechanism illustrated in Fig. 4 functions in substantially the same manner as those previously described, the eccentric shaft 88 rotating on its trunnions 86 and 87, to compensate for the differentiating movements of the gears.

While in Figs. 3 and 4, I have not illustrated the axle housings and bearing by which the differential mechanism is supported, it will be understood that the usual practice may be followed, as regards these details.

While I have illustrated and described what I now consider to be the preferred forms of my invention, it will be understood that these various forms are illustrated for the purpose of disclosing the principles of my invention which may be embodied in other forms of construction without departing from the principle of the invention as the same is defined in the appended claims.

Having thus described my invention, what I claim is:

1. In differential mechanism, the combination of two driven shafts, a driving member having an internal gear that is concentric to said shafts and rotatable relative thereto, two internal gears each of which is operatively connected with one of said shafts and rotatable therewith, a cluster gear eccentrically mounted with respect to said internal gears and having teeth meshing with each of said internal gears, and an eccentric on which said cluster gear is rotatably mounted, said eccentric being mounted for rotation about the axis of said shafts differentially with respect to said driving member.

2. In differential mechanism, the combination of two driven shafts, a driving member having an internal gear that is concentric to said shafts and rotatable relative thereto, two internal gears each of which is operatively connected with one of said shafts and rotatable therewith, a cluster gear eccentrically mounted with respect to said internal gears and having teeth meshing with each of said internal gears, the ratio of first-mentioned internal gear to the portion of said cluster gear that meshes therewith being different than that of either of the second-mentioned internal gears to the portions of said cluster which mesh therewith, and an eccentric on which said cluster gear is rotatably mounted, said eccentric being mounted for rotation about the axis of said shafts differentially with respect to said driving member.

3. In differential mechanism, the combination of two driven shafts, a driving member having an internal gear that is concentric to said shafts and rotatable relative thereto, two internal gears arranged on opposite sides of the first-mentioned gear, one being of smaller pitch diameter than the first-mentioned gear and connected with one of said shafts to rotate therewith and the other being of larger pitch diameter than the first-mentioned gear and connected with the other of said shafts to rotate therewith, a member rotatable about the axis of said shafts differentially with respect to said driving member, and a cluster gear rotatable on the last-mentioned member about an axis eccentric to said shafts, said cluster gear comprising three gears of different pitch diameters which mesh, respectively, with said internal gears.

4. In differential mechanism, the combination of two driven shafts, a driving member having an internal gear that is concentric to said shafts and rotatable relative thereto, two internal gears arranged on opposite sides of the first-mentioned gear, one being of smaller pitch diameter than the first-mentioned gear and connected with one of said shafts to rotate therewith and the other being of larger pitch diameter than the first-mentioned gear and connected with the other of said shafts to rotate therewith, a member rotatable about the axis of said shafts differentially with respect to said driving member, and a plurality of cluster gears rotatable on the last-mentioned member about axes that are eccentric to the axis of said shafts but symmetrically arranged about said axis, said cluster gears each comprising three gears of different pitch diameters which mesh, respectively, with said internal gears.

5. In differential mechanism, the combination of two driven shafts, a rotatable housing comprising rotatably mounted end sections with an internal gear therebetween, means for securing said end sections and said gear together so that they rotate as a unit, internal gears arranged on opposite sides of the first-mentioned gear and independently rotatable in said housing, the last-mentioned internal gears having internally splined hubs to which said shafts are respectively connected, a member rotatable about the axis of said shafts independently of all of said gears, and a cluster gear rotatable on said member about an axis that is eccentric to the axis of said shafts, said cluster gear comprising three gears of different pitch diameters which mesh, respectively, with the aforesaid internal gears.

6. In differential mechanism, the combination of two driven shafts, a rotatable housing comprising rotatably mounted end sections with an internal gear therebetween, means for securing said end sections and said gear together so that they rotate as a unit, internal gears arranged on opposite sides of the first-mentioned gear and independently rotatable in said housing, the last-mentioned internal gears having internally splined hubs to which said shafts are respectively connected, said internal gears also having bearings therein coaxial with said shafts, a member rotatably supported by said bearings, and a cluster gear rotatable on said member about an axis that is eccentric to the axis of said shafts, said cluster gear comprising three gears of different pitch diameters which mesh, respectively, with the aforesaid internal gears.

In testimony whereof, I hereunto affix my signature.

JAMES P. JOHNSON.